Figures 1, 2:
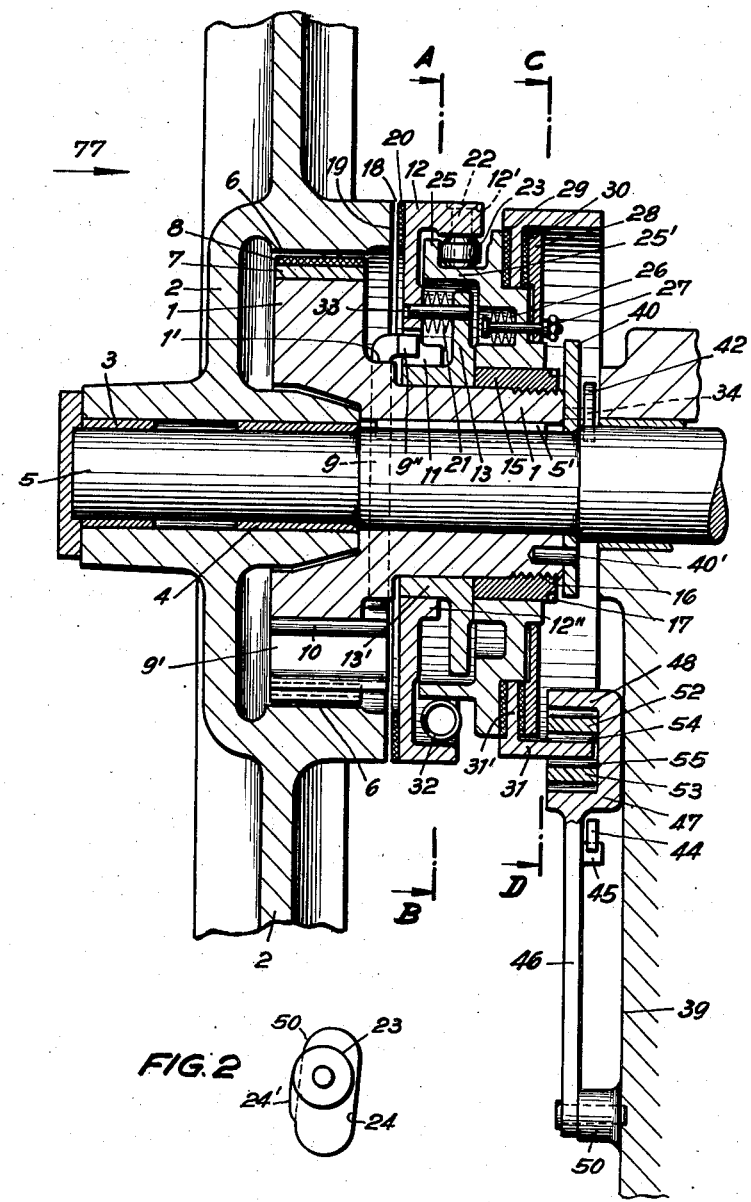

April 8, 1958

L. KNÖCHL 2,829,746

COUPLING MECHANISM FOR PRESSES AND THE LIKE

Filed Aug. 18, 1952

3 Sheets-Sheet 1

INVENTOR

LEO KNOCHL

By: Young, Emery & Thompson
Attys.

April 8, 1958 L. KNÖCHL 2,829,746
COUPLING MECHANISM FOR PRESSES AND THE LIKE
Filed Aug. 18, 1952 3 Sheets-Sheet 2

INVENTOR
LEO KNOCHL
By Young, Emery & Thompson
Attys

April 8, 1958  L. KNÖCHL  2,829,746
COUPLING MECHANISM FOR PRESSES AND THE LIKE
Filed Aug. 18, 1952  3 Sheets-Sheet 3

INVENTOR

LEO KNOCHL
By Young, Emery & Thompson
Attys

United States Patent Office 2,829,746
Patented Apr. 8, 1958

2,829,746

COUPLING MECHANISM FOR PRESSES AND THE LIKE

Leo Knöchl, Goppingen, Wurttemberg, Germany, assignor to L. Schuler A. G., Goppingen, Wurttemberg, Germany, a corporation of Germany Application August 18, 1952, Serial No. 304,882

16 Claims. (Cl. 192—12)

This invention relates to a coupling mechanism preferably for power presses, punching machines, and the like, particularly eccentric driven presses.

The coupling mechanism according to the present invention comprises driving and driven members, a main friction coupling between said members, an auxiliary friction coupling controlling operation of the main friction coupling, and means in the auxiliary coupling for braking the movement of the disconnected members when the main coupling is disengaged.

The mechanism according to the invention makes it possible to arrest the moving members at any desired instant and at any angular position of the main drive shaft or of the coupling members, that is, in the case of power presses, to interrupt the stroke.

The invention also comprises providing a control disc for the auxiliary coupling which also transmits the braking effort. In one construction the control disc is so connected to the auxiliary coupling that a partial rotation of said disc relatively to the auxiliary coupling produces axial movement thereof, for example by means of rolls arranged in an element of the auxiliary coupling and adapted to engage in recesses in the control disc capable of guiding said rolls.

The invention also has a further object in providing a slip coupling having one member connected with control means for the main coupling, and arresting means for holding the other member of the slip coupling, the latter applying the braking torque when said arresting means are operative. The arresting means has clamping devices in the form of brake shoes. By means of this device it is possible not only to control the auxiliary coupling from the slip coupling, but also to use the slip coupling to brake the rotating masses after the main coupling has been disengaged. The slip coupling in this operation acts with constant contact pressure and is engaged or disengaged as a whole. This has the advantage that on engaging the coupling no brake applying spring force has to be overcome. At the instant when the braked masses come to rest, no more forces are acting which have to be overcome, and even in the case of large braking effort, the engaging and disengaging can be effected with little effort. The engaging is effected by merely releasing the arresting means on a stationary member, which is under the action of a weak engaging spring. Neither the slip coupling nor its arresting means require adjustment for wear.

Figure 3:
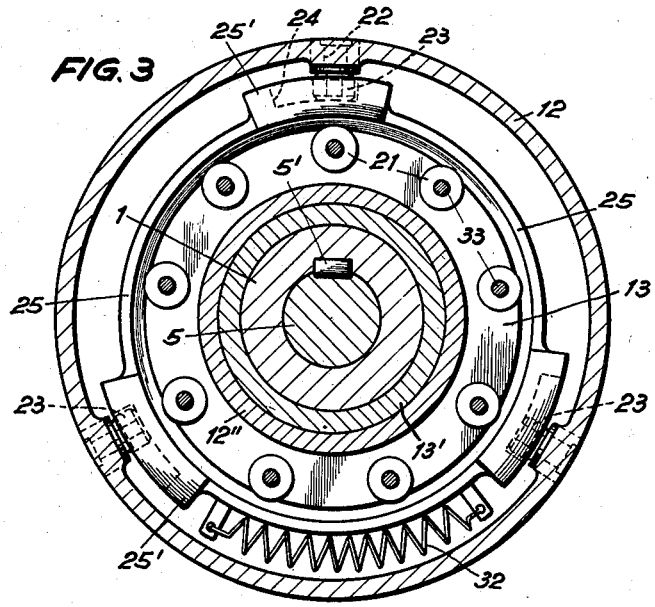
Figure 4:
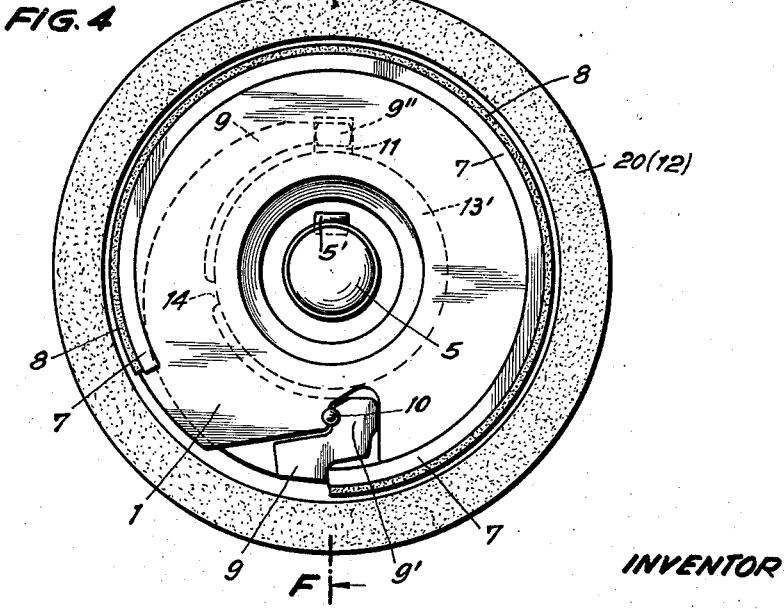
Figure 5:
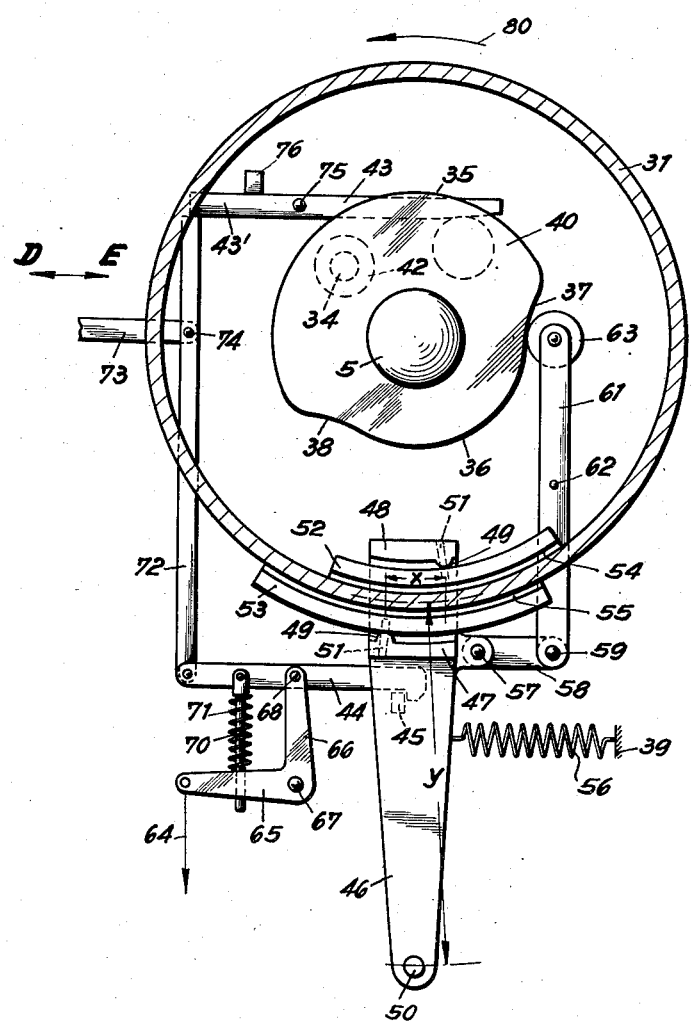

Further objects will be apparent from the following description when considered in connection with the accompanying drawings which show a constructional example of a coupling mechanism embodying the present invention, in which:

Fig. 1 is a vertical sectional elevation through the coupling taken on line E—F of Fig. 4, Fig. 2 is a plan view of a detail, Fig. 3 is a cross section taken on line A—B of Fig. 1, Fig. 4 is a side view taken in the direction of the arrow in Fig. 1, the flywheel being omitted, and Fig. 5 is a cross section taken on line C—D of Fig. 1.

In the illustrated mechanism a flywheel 2, which is the drive member, is rotatably mounted in bushes 3, 4 on the eccentric shaft 5 of a press or the like, and said flywheel 2 and the eccentric shaft 5 constitute the two members which are to be engaged and disengaged by the coupling mechanism.

The main coupling

The main coupling comprises a coupling member 1 fast on the eccentric shaft 5 by means of a key 5'. The coupling member extends into a chamber formed in the flywheel 2 concentric to its hub, the inner wall of which chamber constitutes one friction surface 6 of the main friction coupling. The coupling member 1 is surrounded by an expander ring 7 having a gap therein, one end of which ring abuts on a shoulder of the coupling member 1, and the outer circumference of the ring carries a lining 8 cooperating with the friction surface 6, the arrangement being such that when the ring 7 is expanded its lining 8 is pressed against the friction surface 6. The expanding action is effected by a spreader lever 9 having an arm 9' extending transversely through an opening in the coupling member 1. The arm 9' has a shoulder against which abuts the other end of the gapped expander ring 7. The spreader lever 9 is sickle-shaped, has two arms 9', 9", and is pivoted on a pin 10. The other arm 9" extends over a boss 1' on the coupling member 1 into a recess 11 in a disc 12 of the auxiliary coupling. By turning the lever 9 about the pin 10 the ring 7 is expanded and frictional engagement between the lining 8 and the friction surface 6 is established, thereby engaging the main coupling.

Opposite movement of the spreader lever 9 causes the lining 8 to separate from the friction surface 6 owing to the elasticity of the ring 7, disengaging the main coupling. The elastic force of the expander ring in coupling disengaging direction may be increased if necessary by a spring, not shown.

The auxiliary coupling

This is also a friction coupling and operates on the arm 9" of the spreader lever 9 to close the main coupling, while the opening of the main coupling takes place as soon as the action of the auxiliary coupling holding the main coupling closed, ceases. The auxiliary coupling comprises, in addition to the previously mentioned disc 12 with recess 11 for engaging the arm 9" of the spreader lever, a second disc 13 having a hub portion 13' rotatably mounted on the hub of the coupling member 1. The first disc 12 also has a hub portion 12" which is rotatably mounted on the hub portion 13' of the disc 13. The disc 12 rotates with the disc 13, said discs being connected for this purpose by means of pins 33, which, however, allow axial movement of the disc 12 relatively to the disc 13. Cup springs 21 surrounding the pins 33 are arranged between the discs. The disc 12 has a friction lining 20 cooperating with a friction surface 19 on an opposing face of the flywheel 2. In the position of the parts shown in Fig. 1, the lining 20 is separated from the friction surface 19 by a clearance gap 18.

The rim of the disc 12 has bosses 12' in which are fixed bearing pins 22 carrying rolls 23 rotatable thereon. These rolls are guided in recesses 24 (Fig. 2) in a control disc 25 hereinafter described. The position of the control disc 25 determines the extent to which the disc 12 can move to the left under the action of the springs 21, Fig. 1. When the movement of the disc in this direction is released, then frictional engagement between the lining 20 and the friction surface 19 occurs and the disc 12 is driven by the flywheel 2. The disc 12 when it is driven, undergoes, together with the disc 13, a movement relative to the hub of the coupling member 1. Since the arm 9"

of the spreader lever engages the recess 11 in the disc 12, this relative movement turns the spreader lever pivoted in the coupling member 1, causing engagement of the main coupling.

The force with which the spreader lever 9 is operated and the contact pressure exerted by the expander ring 7, that is the force acting to engage the coupling and the torque which the latter can transmit, depend on the force with which the auxiliary coupling 19, 20 is engaged. This force in turn depends on the contact pressure produced by the cup springs 21. The torque which can be transmitted thus depends on the dimensions of the cup springs 21 of the auxiliary coupling and the force can be substantially less than a spring force acting directly on the expander ring 7. Thus, between the auxiliary coupling and the main coupling, there is present a torque multiplication. The frictional contact does not always occur with the highest transmissible torque, but only with that necessary at the time, because as soon as the working torque is attained, the relative movement between the auxiliary and the main coupling ceases and no further turning of the spreader lever 9 and no stronger pressure by the lining 8 of the expander ring take place. However, if the working torque exceeds the magnitude which can be transmitted with full engaging effort of the auxiliary coupling, then slip is allowed by the main and auxiliary couplings.

The auxiliary coupling is disengaged at 19, 20 in a manner hereinafter described, by the control disc 25 moving relatively to the disc 12.

The coupling used as brake

The above mentioned control disc 25 forms parts of a slip coupling. The disc 25 has a hub portion carrying a second disc 28 connected for rotation therewith by means of tension bolts 27. Between the disc 25 and the heads of the tension bolts cup springs 26 are tensioned which act to draw the disc 28 towards the disc 25. The disc 25 has a friction lining 29 and the disc 28 a friction lining 30, between which linings 29, 30 extends a flange 31' of a ring 31 which forms the counterpart to the first coupling element constituted by the discs 25, 28 of the slip coupling. The frictional force holding the flange 31' between the linings 29 and 30 depends on the pre-tensioning of the cup springs 26, which is adjustable by means of the nuts on said bolts. Once adjusted this contact pressure is not altered. The slip coupling is thus not released and applied like a brake, but remains engaged with constant force. Bringing this force into and out of operation is effected not by varying the closing of the slip coupling, but either the slip coupling as a whole is allowed to rotate with the auxiliary coupling and the main coupling and with the shaft 5, or a part of said slip coupling, namely the ring 31, is held fast. The latter action is effected by a separate arresting device or locking means.

Cup springs are suitable for the auxiliary and slip couplings because they are adapted for large forces acting through short distances. The cup springs 26 for giving the braking force must be stronger the greater the revolutionary speed of the machine. The braking torque to be applied depends on the masses to be braked and on the square of the revolutionary speed. The dimensioning of the cup springs 21 of the auxiliary coupling is determined dependently only on the working torque to be transmitted, that is according to the design of the press or other machine, the stroke, and the pressures to be exerted, and is independent of the braking torque.

Arresting device for the slip coupling

The arresting device for the slip coupling is shown in Fig. 5. The machine frame 39 carries a lever 46 pivoted on a pin 50, which lever has at its upper end two similar webs 47, 48 forming the limbs of a horizontal U. The webs 47, 48 are thickened by ridges 49 at opposite ends in which ridges are secured holding pins 51 which extend with clearance into bores of brake shoes 52, 53. The brake shoe 52 has a lining 54 which lies opposite the inner circumference of the ring 31. The brake shoe 53 has a lining which lies opposite the outer circumference of said ring. The fulcrums of the brake shoes, due to the ridges, are displaced from each other by the distance $x$. The average distance from the fulcrum formed by the pivot 50 is $y$. By turning the lever 46 about the pivot pin 50 in clockwise direction, the shoes 52, 53 are pressed against the ring 31. The ratio of $x:y$ is made such that self-locking by clamp action of the brake shoes is assured. Since also the clamping surfaces are formed as friction shoes, the ring 31, when the clamping is applied, is arrested not with a powerful jerk, but quite gently, which is the more effective as the rotating mass of the ring 31 is small. The friction shoes are of large surface and lined with material of high coefficient of friction so that the specific contact pressure for clamping is kept low. The clamping action takes place only when the rotation of the ring is in the direction of the arrow 80, while in the opposite direction automatic release and free wheel action take place. Thus, the ring 31 is arrested in any desired angular position. To the arm 46 is attached a tension spring 56 anchored at its other end to the machine frame at 39, which spring urges the arresting device to closed position. The release is effected by the following means. The arm 46 has a projection 45 which, in the position of the parts shown in Fig. 5 engages the hook-shaped head of a pawl lever 44, which is jointed at 68 to one arm of a bell crank 65, 66, pivoted on a pin 67 on the machine frame. When the bell crank arm 65 is turned anti-clockwise, by means of a pull member 64, Fig. 5, on its pivot pin 67, the lever 46 will be actuated through the hook-shaped head of the pawl 44 and the projection 45, also in clockwise direction, and the brake shoes operated to release the ring 31.

Upon arrest and release of the ring 31 of the slip coupling depends whether the main coupling will be engaged or disengaged over the auxiliary coupling, as hereinafter described. Therefore, the actuation for the arrest or release of the ring 31 can be combined in simple manner with an after-stroke safety means and with means for selective setting for single stroke or continuous operation.

After-stroke safety, single stroke and continuous operation, stroke interruption The pawl 44 is extended rearwardly from its pivot 68, to the left in Fig. 5, on which extension is jointed a guide rod 70 encircled by a spring 71. The guide rod and spring form a resilient connection between the pawl 44 and the bell crank arm 65. To the end of the pawl 44 is jointed a rod 72 of which the upper end underlies a lever 43, 43' pivoted about a pin 75 on the machine frame. In its uppermost position, the arm 43' of the lever abuts against a fixed stop 76 against which it may be held by a spring, not shown, or the greater weight of the lever arm 43. The lever arm 43 is periodically rocked by means of a roller 42 on a pin 34 fixed in a cam disc 40, which cam disc is connected for rotation with the coupling member 1 and shaft 5, by means of a pin 40'. As long as the shaft 5 rotates, the cam disc 40 also rotates and when the roller 42 reaches the position in which it raises the lever arm 43, the arm 43' pushes down the rod 72 whereby the hook-shaped head of the pawl 44 is disengaged from the projection 45, so that the spring 56 can swing the lever 46 in coupling engaging position, even when by pull on the member 64, the bell crank 65, 66 is held in anti-clockwise rotated position, away from that shown in Fig. 5.

The push rod 72 also operates to shift from single stroke to continuous stroke operation. In the condition shown in Fig. 5 the mechanism permits single strokes only, but by rocking the rod 72 about its joint to the left end of the pawl 44, in the direction from E to D, the top of the rod is withdrawn from under the arm 43' and the movements of the lever 43', 43 will no longer be imposed on said rod. The ring 31, and therefore the machine, will then continue to run as long as the arresting means is held open by the pull member 64.

Owing to the hereinafter described action on the main coupling the holding of the ring 31 by the arresting means takes place at every angular position of the shaft 5, that is at every position of the parts driven thereby, for example, a press ram, the disconnecting and stopping of the machine and its stroke interruption. Stroke interruption during the upward stroke of the ram when the operating device of the machine is released, is not required because the operator during this part of the machine stroke is not exposed to hazard and has free use of his hands. The prevention of stroke interruption on release of the pull member 64 is the main purpose of the cam disc 40. This has a profile portion 35 of larger radius and a profile portion 36 of smaller radius, said portions being joined by smooth curves 37, 38 and the cam profile engages a roll 63 carried on the end of a lever 61 pivoted intermediately at 62 to the machine frame 39. The other end of the lever 61 is jointed at 59 to a link 58 which in turn is jointed at 57 to a lug on the lever 46. When the roller runs on the high portion 35 of the cam profile, the arm 46 is rocked against action of the spring 56 to the left, Fig. 5, thus opening the arresting means and releasing the ring 31, whatever may be the position of the other parts of the mechanism. The machine then will continue running. The extent of the profile portion 35 corresponds in a power press to the up-stroke of the ram. While the roll 63 is in contact with the connecting curve portion 37, the coupling is disengaged at the upper dead point of the ram movement and the eccentric shaft is stopped.

*Cooperation of slip coupling and auxiliary coupling, control of the auxiliary coupling, and use of the slip coupling as a brake*

The recesses 24 previously referred to are formed in bosses 25' on the rim of the disc 25 of the slip coupling and are engaged by the rolls 23 mounted on the disc 12 of the auxiliary coupling, so as to limit relative movement between the slip coupling and the auxiliary coupling. At rest condition, such a relative movement as produced by an engagement spring 32 connected between the slip coupling disc 25 and the auxiliary coupling disc 12, which spring is tensioned at the beginning of a machine stopping operation and continues tensioned during the operation, so that it is still tensioned when the machine stops. On stoppage, with the arresting means, Fig. 5, holding the ring 31, if the arresting means is released, the ring 31 and also the slip coupling as a whole are also released, the slip coupling as a whole becomes axially displaceable on the ring 15, screw threaded at 16 on the hub of the coupling member 1, which ring has notches for engagement by a wrench so that axial adjustment is possible, and under the action of the spring 32 a slight rotation of said slip coupling can take place relatively to the still stationary auxiliary coupling. This rotation is sufficient to enable the rolls 23 to move to the left, Fig. 1, because the recesses 24 have a slight inclination in the axial direction. Depending on the extent by which the rolls 23 can move to the left, Fig. 1, the springs 21 press the disc 12 and its lining 20 against the friction surface 19 to the rotating wheel 2. As soon as the frictional engagement at 19, 20 becomes effective, the auxiliary coupling and disc 12 are driven by the wheel 2, the rolls 23 arrive at and abut against ends of the recesses 24 where they are held by the spring 32, whereby the disc 25 and the slip coupling, released by the arresting device, are also driven. The auxiliary coupling first makes a movement relatively to the coupling member 1 so that by turning the spreader lever 9 as previously described, the main coupling is closed and the shaft 5 is driven.

If the ring 31 of the slip coupling is held by the arresting means of Fig. 5, then the other parts at first continue to rotate a small amount, during which they have to overcome the friction produced by the action of the springs 26, between the flange 31' and the linings 29, 30, so that the slip coupling acts as a brake. At first, the disc 25, used as control disc for the auxiliary coupling, also is braked which produces movement of this disc relatively to the initially more rapidly rotating auxiliary coupling 12 so that the rolls 23 now travel in the recesses 24 in the reverse direction as compared with the engaging operation. Owing to the inclination of the recesses the auxiliary coupling is now disengaged by axial travel so that the operation of the spreader lever 9 and the main coupling is discontinued and the main coupling disengages. The auxiliary coupling, however, remains coupled with the still rotating shaft 5, owing to the engagement of the arm 9" of the spreader lever mounted in the coupling member 1 which is fixed on said shaft 5. The rotating masses are brought to rest by the friction of the linings 29 and 30 against the flange 31' of the ring 31 held by the arresting means. The braking force is thus dependent on the adjustment of the springs 26 and can be kept constant.

The recesses 24 can be given a certain shape to prevent shock on disengaging the auxiliary coupling, and when the rolls 23 reach the end of the recesses. The left hand side wall of the recess, instead of being linear like the right hand wall and as indicated by the broken line, Fig. 2, may have an outward bulge. The bulge begins nears the end of the recess under an angle of 45° from the end position of the roll axis, and with a curvature corresponding to the roll diameter, so that at both ends of the recess this side wall has high portions 50 which modify the travel of the roll along the wall of the recess 24. On disengaging the coupling the impact of the roll 23 against the end of the recess is softened because just before this impact the resistance of the high portion 50 has to be overcome, so that the cup springs 21 of the auxiliary coupling are transiently further tensioned by the momentum of the discs and thus a cushioned impact is obtained. Since the engaging torque is applied by the spring 32 the coupling springs do not have to exert any torque on the inclined surfaces of the recesses 24. Their inclination, therefore, may be less than the friction angle. When the coupling is engaged the path of power transmission runs through the friction surface of ring 15, and when the coupling is disengaged it runs through the friction surface of the flange of the disc 25 surrounding the ring 15.

I claim as my invention:

1. A coupling mechanism particularly for power presses, punching machines and the like, with eccentric drive, comprising driving and driven members, a main friction coupling between said members, an auxiliary friction coupling controlling the operation of the main coupling, movable disconnecting members, and means in the auxiliary friction coupling for braking the momentum of the moving disconnected members upon disengagement of the main coupling.

2. A coupling mechanism according to claim 1, in which the braking means in the auxiliary friction coupling includes a control disc which transmits the braking effort.

3. A coupling mechanism according to claim 1, in which the braking means in the auxiliary friction coupling includes a control disc which transmits the braking effort, and in which connections are provided between the control disc and the auxiliary friction coupling operative upon rotary movement of the disc relatively to the auxiliary friction coupling to cause axial movement of said coupling.

4. A coupling mechanism according to claim 1, in which the braking means in the auxiliary friction coupling includes a control disc which transmits the braking effort, and in which the control disc is provided with recesses with roll guiding surfaces, the ends of which constitute stop surfaces for the relative movement between the auxiliary friction coupling and the control disc, and the roll guiding surfaces of the recesses have high portions.

5. A coupling mechanism according to claim 1, in which the braking means in the auxiliary friction coupling includes a control disc which transmits the braking effort, and in which the control disc is provided with recesses with roll guiding surfaces, the ends of which constitute stop surfaces for the relative movement between the auxiliary friction coupling and the control disc, and the roll guiding surfaces of the recesses have high portions and the recesses have an inclination less than the angle of friction.

6. A coupling mechanism according to claim 1, in which a slip coupling is provided comprising a member connected to a control means for the main coupling, and another member cooperating with an arresting means which is capable of exerting a braking torque when the slip coupling is engaged.

7. A coupling mechanism according to claim 1, in which a slip coupling is provided comprising a member connected to a control means for the main coupling, another member cooperating with an arresting means which is capable of exerting a braking torque when the slip coupling is engaged, and in which a spring is arranged between the member of the slip coupling connected to the control means and the auxiliary friction coupling, said spring being capable of exerting a force and of engaging the coupling.

8. A coupling mechanism according to claim 1, in which arresting means are provided for holding a member of a slip coupling, said arresting means including brake shoes.

9. A coupling mechanism according to claim 1, in which arresting means are provided for holding a member of a slip coupling, said arresting means including brake shoes, and the arresting means being self-locking in one direction.

10. A coupling mechanism according to claim 1, in which a lever is provided pivoted to a machine frame and having brake shoes jointed to said lever and spaced from each other and in which a slip coupling with a ring are provided, said shoes acting on the inner and outer circumferences of the ring.

11. A coupling mechanism according to claim 1, in which a lever is provided pivoted to a machine frame and having brake shoes jointed to said lever and spaced from each other, and in which a slip coupling with a ring are provided, said shoes acting on the inner and outer circumferences of the ring, the arm having its pivot at a distance from the center of the brake shoes, the ratio being large enough to produce self-locking at a predetermined angle of friction.

12. A coupling mechanism according to claim 1, in which a slip coupling is provided, the main coupling and the auxiliary friction coupling and also the slip coupling being arranged concentrically on the eccentric shaft of the power press.

13. A coupling mechanism according to claim 1, in which a machine shaft and arresting means are provided and mechanism is provided for retaining the arresting means in released position, said mechanism being operated by a member controlled by the machine shaft in such a manner that release is discontinued after a certain angle of rotation, and said arresting means being adapted to grip one part of the main friction coupling.

14. A coupling mechanism according to claim 1, in which a machine shaft and arresting means are provided and mechanism is provided for retaining the arresting means in released position, said mechanism being operated by a member controlled by the machine shaft in such a manner that release is discontinued after a certain angle of rotation independently of the condition of the machine operating controls, the disconnecting means being selectively shifted to operative and inoperative positions for shift between single stroke and continuous operation, said arresting means being adapted to grip one part of the main friction coupling.

15. A coupling mechanism according to claim 1, in which a machine shaft and arresting means are provided and mechanism is provided for retaining the arresting means in released position, said mechanism being operated by a member controlled by the machine shaft in such a manner that release is discontinued after a certain angle of rotation independently of the condition of the machine operating controls, and in which means are provided operated by a cam disc from the machine shaft for bringing the arresting means positively into release position during a partial rotation of said shaft, said arresting means being adapted to grip one part of the main friction coupling.

16. A coupling mechanism according to claim 1, in which a slip coupling is provided comprising a control means, a member connected to a control means for the main coupling, an arresting means, and another member cooperating with an arresting means which is capable of exerting a braking torque when the slip coupling is engaged, and in which plate springs and means for adjusting said springs are provided to create the coupling force for the auxiliary coupling and the friction force for the slip coupling.

References Cited in the file of this patent

UNITED STATES PATENTS

| | | |
|---|---|---|
| 1,907,480 | Derby | May 9, 1933 |
| 2,348,891 | Eason | May 16, 1944 |
| 2,662,624 | Giffen | Dec. 15, 1953 |

FOREIGN PATENTS

| | | |
|---|---|---|
| 310,954 | Germany | May 1, 1918 |
| 342,446 | Great Britain | Feb. 5, 1931 |